(12) United States Patent
Sriram

(10) Patent No.: US 10,753,473 B2
(45) Date of Patent: Aug. 25, 2020

(54) ARTICLE HAVING PLURALITY OF FUNCTIONALLY GRADED REGIONS AND A METHOD OF MANUFACTURING THEREOF

(71) Applicant: SUNDRAM FASTENERS LIMITED, Chennai (IN)

(72) Inventor: S. Sundar Sriram, Tamil Nadu (IN)

(73) Assignee: Sundram Fasteners Limited, Chennai (IN)

( * ) Notice: Subject to any disclaimer, the term of this patent is extended or adjusted under 35 U.S.C. 154(b) by 360 days.

(21) Appl. No.: 14/813,473

(22) Filed: Jul. 30, 2015

(65) Prior Publication Data

US 2016/0033035 A1   Feb. 4, 2016

(30) Foreign Application Priority Data

Jul. 30, 2014 (IN) .......................... 3716/CHE/2014

(51) Int. Cl.
*F16H 63/18* (2006.01)
*B22F 5/10* (2006.01)
*B60K 17/00* (2006.01)
*B22F 1/00* (2006.01)
*B22F 3/12* (2006.01)
*B22F 5/00* (2006.01)
*C22C 33/02* (2006.01)
*B22F 3/03* (2006.01)
*F16H 3/091* (2006.01)

(52) U.S. Cl.
CPC ........... *F16H 63/18* (2013.01); *B22F 1/0003* (2013.01); *B22F 3/12* (2013.01); *B22F 5/00* (2013.01); *B22F 5/106* (2013.01); *B60K 17/00* (2013.01); *B22F 2003/033* (2013.01); *B22F 2207/01* (2013.01); *B22F 2998/10* (2013.01); *C22C 33/02* (2013.01); *F16H 3/0915* (2013.01); *F16H 2200/0039* (2013.01)

(58) Field of Classification Search
CPC ............. B22F 5/00; B22F 5/106; F16H 63/18
USPC ........................................................ 75/246
See application file for complete search history.

(56) References Cited

U.S. PATENT DOCUMENTS

2004/0159180 A1* 8/2004 Ogawa .................. B21D 37/16
74/593

* cited by examiner

*Primary Examiner* — Weiping Zhu
(74) *Attorney, Agent, or Firm* — Harness, Dickey & Pierce, P.L.C.

(57) ABSTRACT

The present disclosure generally relates to an article used in the manual transmission gearbox in automobiles. More particularly, it relates to an article used in manual transmission gearbox, namely the shifter dog, composition used for manufacturing the shifter dog and a method of manufacturing the shifter dog.

8 Claims, 8 Drawing Sheets

ARTICLE HAVING PLURALITY OF FUNCTIONALLY GRADED REGIONS AND A METHOD OF MANUFACTURING THEREOF

FIELD

The present disclosure generally relates to an article used in manual transmission in gearbox of automobiles and also relates to a composition used for manufacturing the article. More particularly, the present disclosure relates to a shifter dog comprising plurality of functionally graded regions and also relates to a composition used to manufacture the shifter dog comprising plurality of functionally graded regions.

BACKGROUND

FIG. 1 shows an assembly of shifter dog wherein stick 1 is used to shift gears and has either a spherical end 2 as shown or an end with an alternate geometry which lodges itself on the slot 3 of the shifter dog. On lodging, the shifter dog transmits the force applied by the driver on the stick 1 to a shaft 4 or an appropriate mechanical device which is specific to the design of the gear box to enable changing of the gear which is engaged to the drive shaft. FIG. 2 shows a typical shifter dog as in prior art, where the entire shifter dog is produced out of a homogenous ferrous material either by forging, casting or any other alternate manufacturing processes. In the FIG. 2, slot 3 where the spherical end of stick 1 engages requires sufficient mechanical strength and wear resistance to withstand the loads imparted by the driver intending to shift the gears. To impart sufficient strength and wear resistance, the portion in the shifter dog is usually induction hardened or the shifter dog as a whole is through hardened. The cylindrical portion 6 as shown in FIG. 2 is the portion at which the shaft is affixed to the shifter dog, through which necessary force required to the shift gears is transmitted. Thus, the homogenous shifter dog undergoes multiple machining and multiple heat treatments to get to the final shape and strength respectively. On the other hand, due to uniform material composition of the shifter dog and repeated contact between slot 3 and the spherical end of stick 1, the wear resistance and load withstanding capacity or higher strength in the shifter dog is considerably reduced.

In view of aforementioned limitations, there is a need to develop a shifter dog which is capable of having higher strength than that of the existing shifter dog. Also, there is a need to introduce distinct material compositions at locations in the shifter dog which are repeatedly used or contacted by the ball end of the stick. In addition, there is also a need to provide a method of manufacturing a method to optimise material composition used in the shifter dog.

SUMMARY

The shortcomings of the prior art are overcome and additional advantages are provided through the present disclosure, which are realized through the techniques adapted in the present disclosure. Other embodiments and aspects of the disclosure are described in detail herein and are considered a part of the claimed disclosure.

In one embodiment, the present disclosure provides for an article having plurality of functionally graded regions, wherein at least one of the functionally graded regions is having martensitic microstructure or substantially having martensitic microstructure along with at least one of the functionally graded regions having non-martensitic or substantially having non-martensitic microstructure.

In one embodiment, the non-martensitic microstructure is selected from a group comprising pearlitic, bainitic, ferritic microstructure and combinations thereof.

In one embodiment, the functionally graded region having substantially martensitic microstructure further comprise non-martensitic microstructure selected from a group comprising pearlitic, bainitic, ferritic microstructure and combinations thereof In one embodiment, the functionally graded region having non-martensitic microstructure comprises pearlitic microstructure substantially.

In one embodiment, the functionally graded regions having martensitic or substantially having martensitic microstructure is made of a composition selected from a group comprising powder metal pre-alloyed Steels, hybrid low alloy steels, Sinter-Hardened Steels, its equivalents and combination thereof.

In one embodiment, the functionally graded regions having non-martensitic or substantially having non-martensitic microstructure is made of a composition selected from a group comprising powder metal Iron and Carbon Steels, Iron-Copper and Copper Steels, Iron-Nickel and Nickel Steels, Diffusion alloyed steels, its equivalents and combination thereof.

In one embodiment, the article has at least two functionally graded regions, where one of the functionally graded regions is having substantially martensitic microstructure and the other functionally graded region is having non-martensitic microstructure.

In one embodiment, the article has at least two functionally graded regions, where one of the functionally graded regions is having substantially martensitic microstructure and the other functionally graded region is having non-martensitic microstructure comprising pearlitic microstructure substantially.

In one embodiment, the article is a shifter dog.

In one embodiment, the present disclosure provides for a method of manufacturing the article. The method comprising acts of filling a die cavity configured in a shape of the article with a composition comprising two or more powder mixes each containing unalloyed or pre-alloyed iron mixed with additives in predetermined amounts, and industrially applicable additives; simultaneously pressing the filled composition in the die cavity in a single stroke to obtain a green compact of the article; wherein the article is configured with two functionally graded regions such that the at least one of the functionally graded region is having lower hardness, non-martensitic microstructure and lower mechanical strength, than that of the other functionally graded region which has higher hardness, substantial martensitic microstructure and higher mechanical strength; annealing the green compact between predetermined temperatures for predetermined hours; cooling the annealed green compact to a room temperature; machining the cooled compact to a desired shape of the article; and sintering the machined compact in a furnace by heating at predetermined temperatures for predetermined hours in a protective atmosphere which prevents oxidation or decarburization of the part.

In one embodiment, the additives are selected from a group of metal comprising carbon (C), Nickel (Ni), Molybdenum (Mo), Manganese (Mn), Chromium (Cr), Vanadium (V), Tungsten (W) and Copper (Cu).

In one embodiment, the industrially applicable additives are binders and lubricants used for aiding compaction and machining.

In one embodiment, the annealing of the green compact is carried out in any one of the atmospheres selected from a group comprising vacuum, endo-gas, and $N_2+H_2$ atmosphere 700° C. to 900° C. for 0.25-6 hours in either a batch type or continuous furnace.

In one embodiment, the room temperature for cooling the annealed green compact is ranging between 265 K and 325 K.

In one embodiment, the sintering is carried out at temperature ranging between 1050° C. and 1300° C. for 0.25-6 hours in a protective atmosphere.

In one embodiment, the present disclosure also provides for a transmission gearbox comprising the article.

The foregoing summary is illustrative only and is not intended to be in any way limiting. In addition to the illustrative aspects, embodiments, and features described above, further aspects, embodiments, and features will become apparent by reference to the drawings and the following detailed description.

DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying drawings wherein like reference numerals represent like elements and in which:

Figure 6:
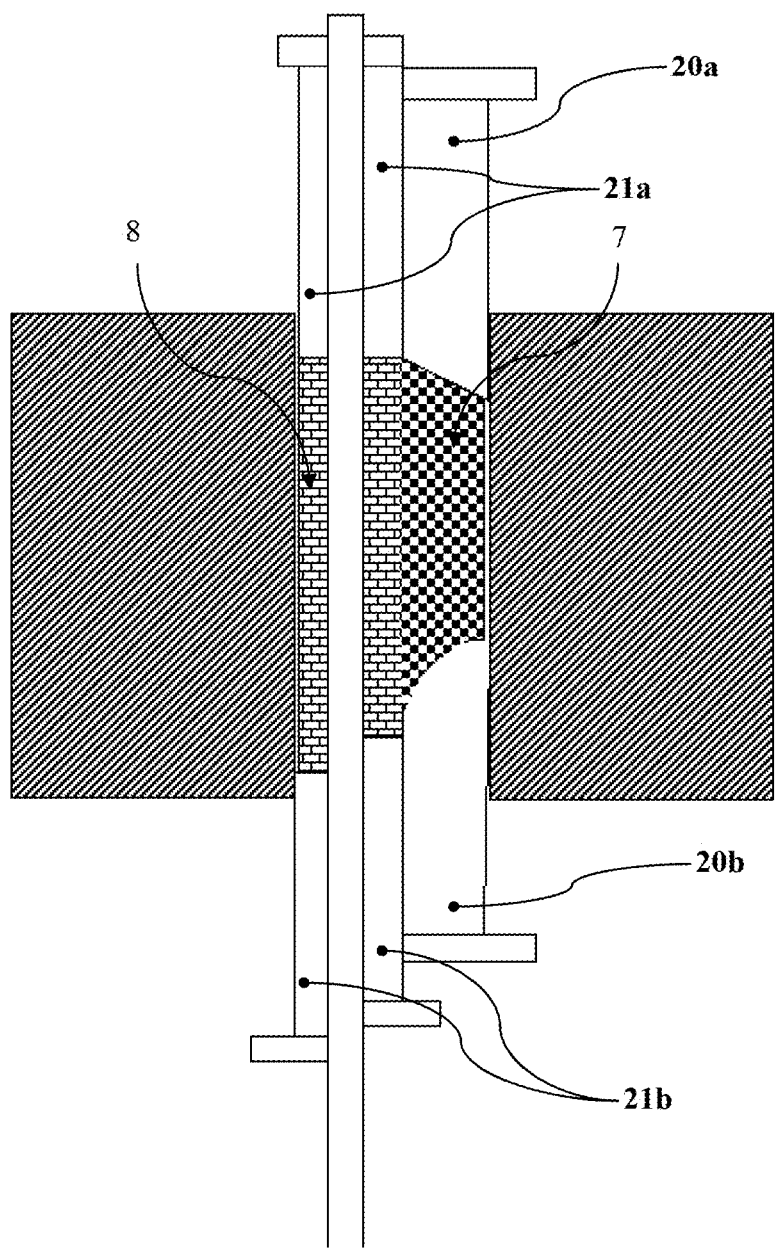

FIG. 6 shows the schematic of the tool layout at the end compaction resulting in the formation of a functionally graded shifter dog according to one non-limiting embodiment of the present disclosure. The top punches 20a and 21a move downwards and the bottom punches 20b and 21b move upwards compressing the powder in the die cavity to reach the position shown in the figure where the thickness and density of the part is attained. Alternatively, the bottom punch upward movement can be achieved by the die moving downwards along with the top punches.

Figure 7:
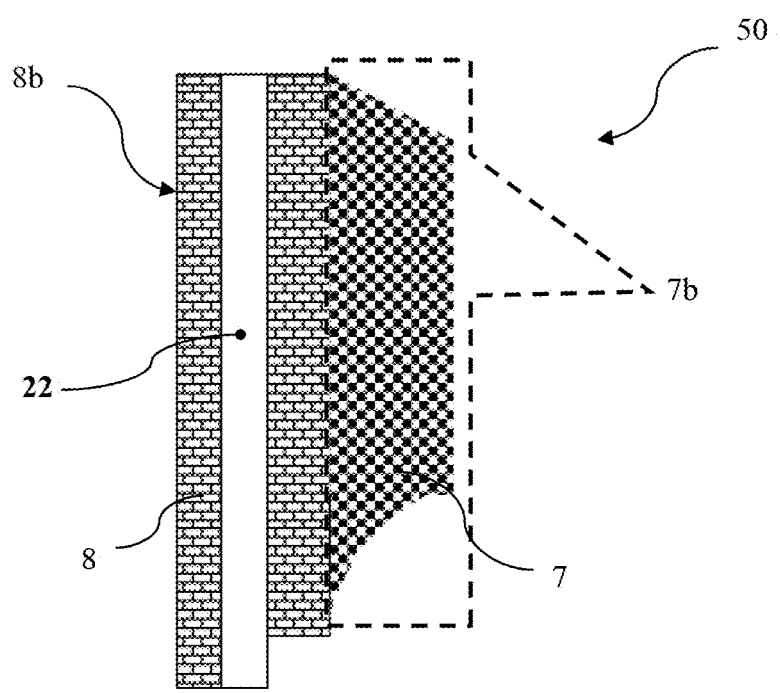

FIG. 7 shows the sectional elevation of the functionally graded shifter dog at the end of compaction according to one non-limiting embodiment of the present disclosure.

Figure 8:
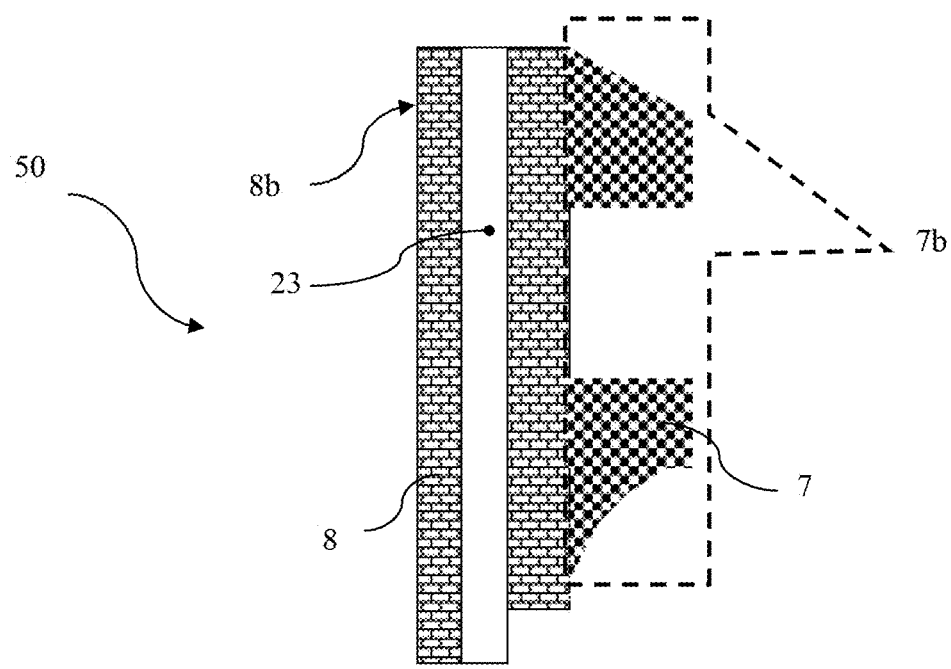

FIG. 8 shows a sectional elevation of the functionally graded shifter dog after machining according to one non-limiting embodiment of the present disclosure.

Figure 9:
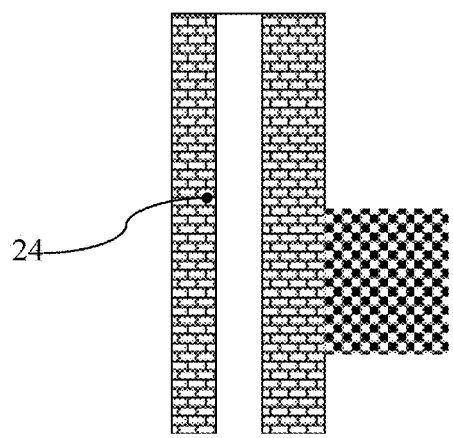

FIG. 9 shows a sectional elevation of the functionally graded shifter dog after machining according to one non-limiting embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure relates to an article having plurality of functionally graded regions, wherein at least one of the functionally graded regions is having martensitic microstructure or substantially having martensitic microstructure along with at least one of the functionally graded regions having a non-martensitic microstructure or substantially having non-martensitic microstructure.

In an embodiment of the present disclosure, the non-martensitic microstructure is selected from a group comprising pearlitic, bainitic, ferritic microstructure and combination thereof.

In an embodiment of the present disclosure, the article has plurality of functionally graded regions wherein at least one of the functionally graded regions is substantially having martensitic microstructure along with at least one of the functionally graded regions having non-martensitic microstructure.

In an embodiment of the present disclosure, the article has plurality of functionally graded regions wherein at least one of the functionally graded regions is having martensitic microstructure along with at least one of the functionally graded regions substantially having non-martensitic microstructure.

In an embodiment of the present disclosure, the at least one of the functionally graded regions having substantially martensitic microstructure further comprise non-martensitic microstructure selected from a group comprising pearlitic, bainitic, ferritic microstructure and combination thereof in the remaining portions of the region.

In an embodiment of the present disclosure, the at least one of the functionally graded regions is having at least 80% martensitic microstructure and non-martensitic microstructure selected from a group comprising pearlitic, bainitic, ferritic microstructure and combination thereof in the remaining portions of the region.

In an embodiment of the present disclosure, the at least one of the functionally graded regions having non-martensitic microstructure comprise pearlitic microstructure substantially while the remaining portions of the region comprise microstructure selected from a group comprising bainitic, ferritic microstructure and combination thereof.

In an embodiment of the present disclosure, the at least one of the functionally graded regions having non-martensitic microstructure comprise at least 70% pearlitic microstructure.

In an embodiment of the present disclosure, the functionally graded regions having martensitic microstructure or substantially having martensitic microstructure is made of a material selected from a group comprising powder metal pre-alloyed Steels, hybrid low alloy steels, sinter-Hardened Steels, its equivalents and combination thereof.

In an embodiment of the present disclosure, the functionally graded regions having non-martensitic microstructure or substantially having non-martensitic microstructure is made of a material selected from a group comprising Iron and Carbon Steels, Iron-Copper and Copper Steels, Iron Nickel and Nickel Steels, Diffusion alloyed steels, its equivalents and combination thereof.

Throughout the specification, the term "material" has been interchangeably used as "composition(s)".

In an embodiment of the present disclosure, the article has at least two functionally graded regions where one of the functionally graded regions is having martensitic microstructure or substantially having martensitic microstructure and the other functionally graded region is having non-martensitic microstructure or substantially having non-martensitic microstructure.

In an embodiment of the present disclosure, the article has at least two functionally graded regions where one of the functionally graded regions is having martensitic microstructure and the other functionally graded region is substantially having non-martensitic microstructure.

In an embodiment of the present disclosure, the article has at least two functionally graded regions where one of the functionally graded regions is substantially having martensitic microstructure and the other functionally graded region is having non-martensitic microstructure.

In an embodiment of the present disclosure, the non-martensitic microstructure is selected from a group comprising pearlitic, bainitic, ferritic microstructure and combination thereof.

In an embodiment of the present disclosure, the functionally graded region having substantially martensitic microstructure further comprise non-martensitic microstructure selected from a group comprising pearlitic, bainitic, ferritic microstructure and combination thereof in the remaining portions of the region.

In an embodiment of the present disclosure, the one of the functionally graded regions is having at least 80% martensitic microstructure and further comprise non-martensitic microstructure selected from a group comprising pearlitic, bainitic, ferritic microstructure and combination thereof in the remaining portions of the region.

In an embodiment of the present disclosure, the functionally graded region having non-martensitic microstructure comprise pearlitic microstructure substantially while the remaining portions of the region comprise microstructure selected from a group comprising bainitic, ferritic microstructure and combination thereof.

In an embodiment of the present disclosure, the functionally graded region having non-martensitic microstructure comprises at least 70% pearlitic microstructure.

In an embodiment of the present disclosure, the functionally graded region having martensitic microstructure or substantially having martensitic microstructure is made of a material selected from a group comprising powder metal pre-alloyed Steels, hybrid low alloy steels, sinter-Hardened Steels, its equivalents and combination thereof.

In an embodiment of the present disclosure, the functionally graded region having non-martensitic microstructure or substantially having non-martensitic microstructure is made of a material selected from a group comprising Iron and Carbon Steels, Iron-Copper and Copper Steels, Iron Nickel and Nickel Steels, Diffusion alloyed steels, its equivalents and combination thereof.

In an embodiment of the present disclosure, the functionally graded region having non-martensitic microstructure provides for lower wear resistance and the functionally graded region having a substantially martensitic microstructure provides for higher mechanical strength and wear resistance.

The present invention relates to an article having plurality of compositions/materials in functionally graded regions within the article. The composition/material comprises two different grades of powder metal steel, optionally along with industrially applicable additive as in lubricants for aiding compaction and machining aids.

The present invention relates to an article having plurality of compositions/materials in functionally graded regions wherein at least one of the functionally graded regions is made of a material selected from a group comprising powder metal pre-alloyed Steels, hybrid low alloy steels, sinter-Hardened Steels, its equivalents and combination thereof; along with at least one of the functionally graded regions made of a material selected from a group comprising Iron and Carbon Steels, Iron-Copper and Copper Steels, Iron Nickel and Nickel Steels, Diffusion alloyed steels, its equivalents and combination thereof.

In an embodiment of the present disclosure, the article is a shifter dog 50.

The present disclosure relates to an article having plurality of functionally graded regions, wherein at least one of the functionally graded regions is substantially having a martensitic microstructure made of a material selected from a group comprising pre-alloyed Steels, hybrid low alloy steels, sinter-Hardened Steels, its equivalents and combination thereof; along with at least one of the functionally graded regions having non-martensitic microstructure is made of a material selected from a group comprising Iron and Carbon Steels, Iron-Copper and Copper Steels, Iron Nickel and Nickel Steels, diffusion alloyed steels, its equivalents and combination thereof.

Figure 1:
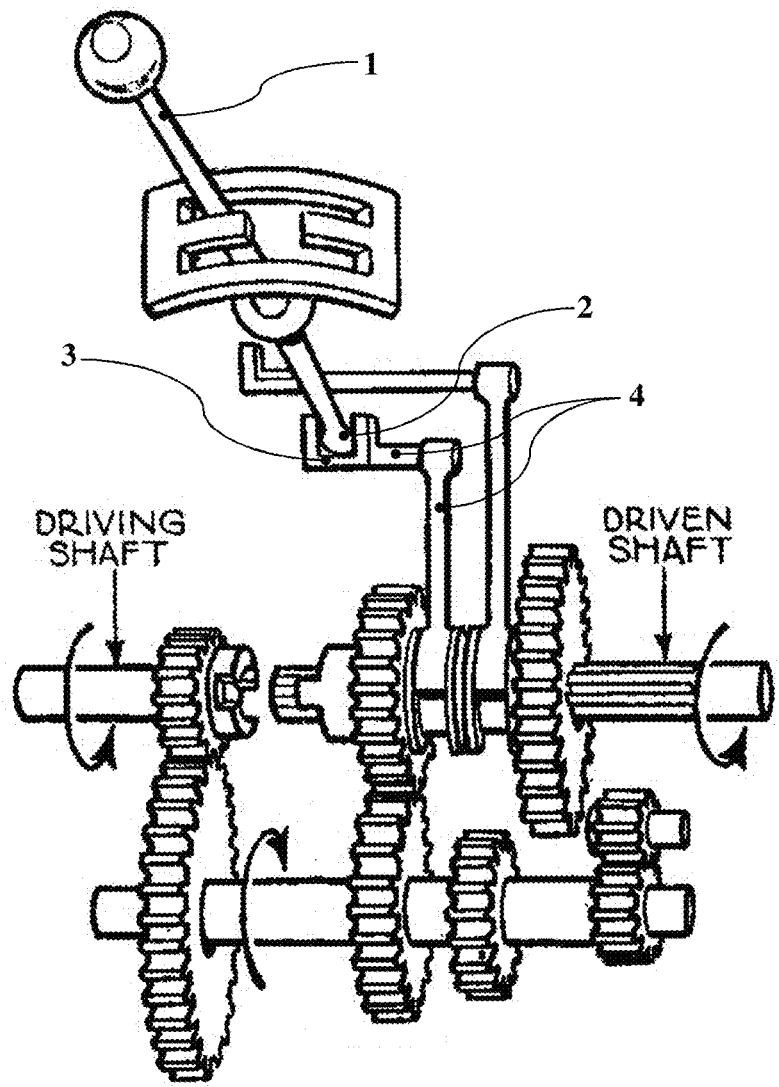
FIG. 1 shows a schematic diagram of a manual transmission gear box in automobiles according to prior art.
Figure 2:
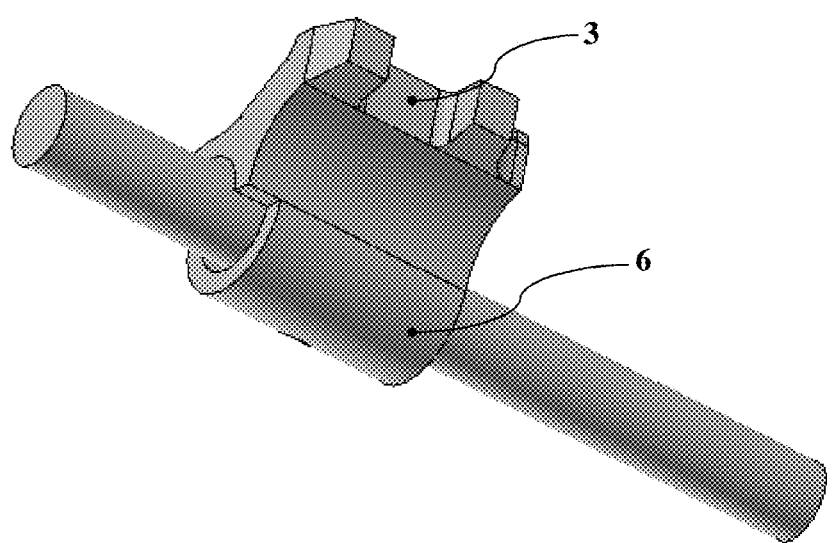
FIG. 2 shows a homogenous shifter dog having uniform chemical composition produced by either forging, casting, machining, powder metallurgy processes according to the prior art.
Figure 3:
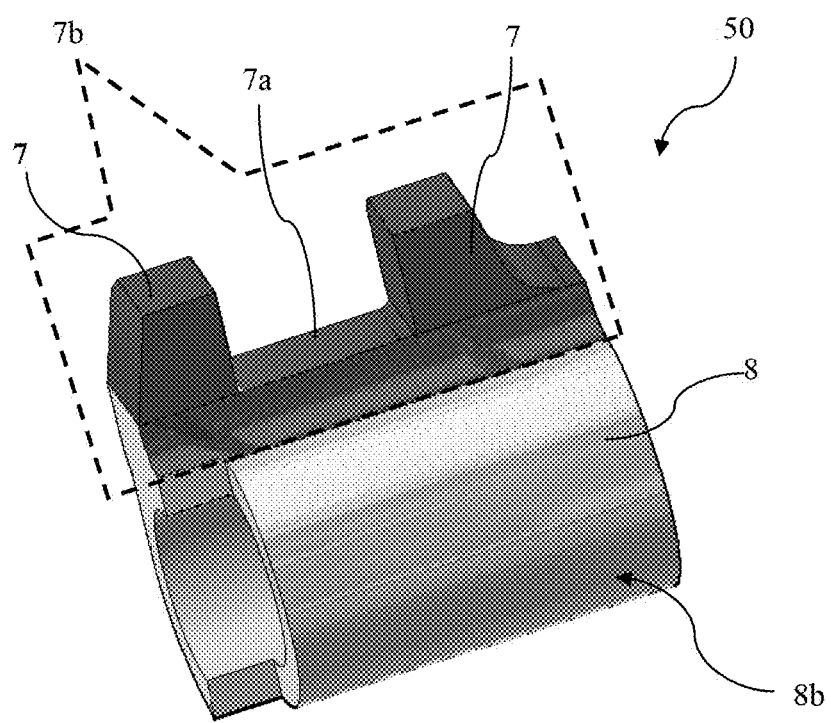
FIG. 3 shows a functionally graded shifter dog according to one non-limiting embodiment of the present disclosure.

In one embodiment, the present disclosure as depicted in FIG. 3 provides for an article having plurality of functionally graded regions within the article, wherein the plurality of functionally graded regions is designed to address the functional requirement specific to location.

In another embodiment, the plurality of functionally graded regions is in a manner so that the region comprising slot 7a of FIG. 3 will comprise a material possessing higher mechanical strength and wear resistance in the sintered condition as compared to the material used in location 8 of FIG. 3. The materials used in 7 & 8 are as listed in Table 1 as below.

TABLE 1

| Material which can be used in region comprising of location 7 as shown in FIG. 3 | Material which can be used in region comprising of location 8 as shown in FIG. 3 |
|---|---|
| FL5305, FLC4608, FLC-4805, FLC-48108, FLC2-4808, FLC2-5208, FLC24908 | MPIF F-0000, F-0005, F-0008 |
| FLNC4408, FLNC4405, FLN4-4405, FLN4-4408, FLN4-4405 (HTS) | MPIF FC 0200, FC0205, FC 0208, FC0505, FC0508 FC 0808, FC1000 |
| and combination thereof. | MPIF FN0200, FN0205, FN0208, FN0405, FN0408, FN5000, FX1000, FX1005, FX-1008 |
| | MPIF FD0200 FD 0205, FD0208, |

TABLE 1-continued

| Material which can be used in region comprising of location 7 as shown in FIG. 3 | Material which can be used in region comprising of location 8 as shown in FIG. 3 |
|---|---|
| | FD0400, FD0405, FD0408, FLC2-5208, FLN2-4400 and combination thereof. |

In another embodiment, the plurality of functionally graded regions is in a manner so that the region comprising slot 7a of FIG. 3 comprise material which results in a predominantly/substantially martensitic with marginal presence of bainitic or pearlitic microstructure after sintering and the microstructure of the region comprising of location 8 will be predominantly/substantially pearlitic with some amount of ferrite.

In another embodiment, the martensitic and bainitic microstructure is achieved without the aid of quenching the parts in a liquid media from austenitic temperature.

Figure 4:
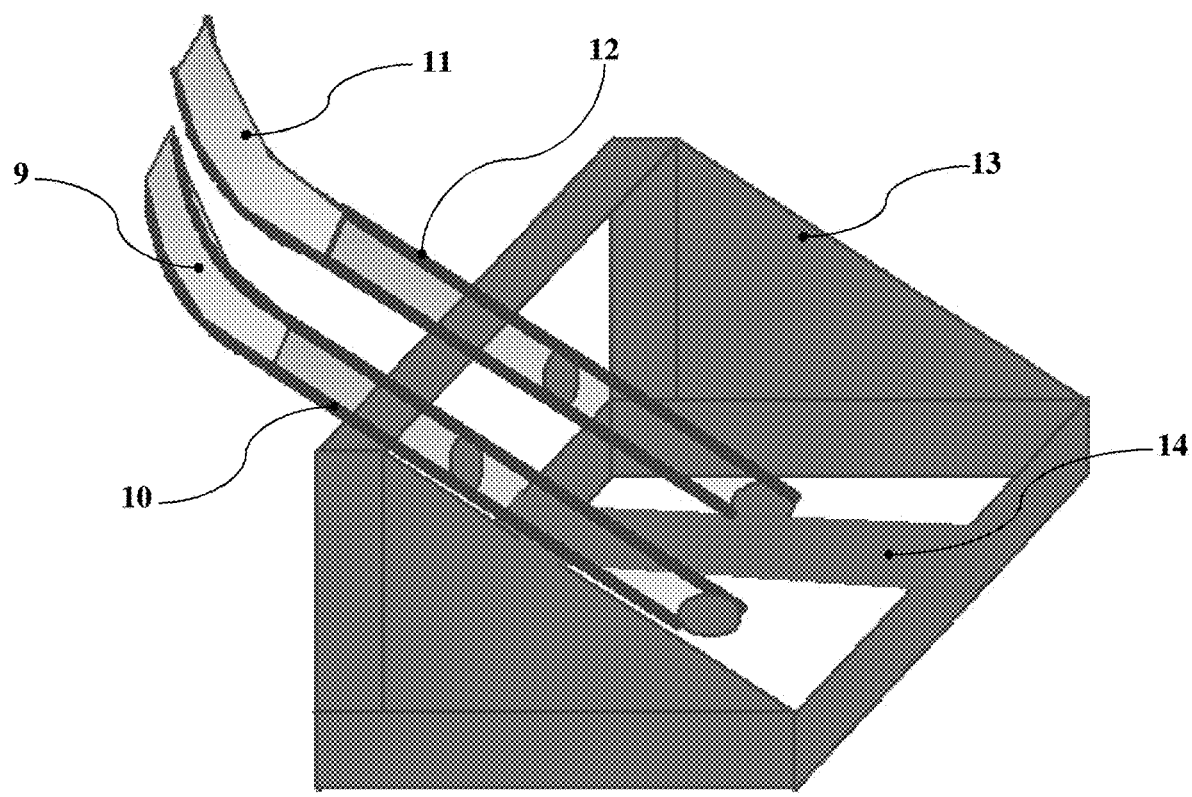
FIG. 4 shows a schematic of the device used to feed two powder mixes into the die cavity according to one non-limiting embodiment of the present disclosure.

In one embodiment, the present disclosure provides for a method of manufacturing the article (as shown in FIG. 4). The method comprising acts of filling the cavity configured on the article with two powder mixes filling the die cavity, then simultaneously pressing the powder mixes in the die cavity in a single stroke using predetermined device e.g. punches and core rods, to obtain a green compact of the article, wherein the cavity on the article is configured as two functionally graded regions corresponding to locations 7 & 8 of the article as depicted in FIG. 3 such that the region comprising of location 7 comprise material as defined in Table 1 resulting in a martensitic microstructure after sintering and the region comprising of location 8 comprise material as defined in Table 1 resulting in a pearlitic and ferritic microstructure after sintering, wherein the sintering is carried out by heating the green compact in a protective non-oxidising and non-carburising and non-decarburising gaseous atmosphere, to temperatures ranging from 1050° C. to 1350° C. and holding at that temperatures for periods ranging from 15-120 minutes in a batch type furnace or a continuous furnace. Alternatively, the atmosphere can be vacuum maintained at a level of 0.05 torr or lower.

In an embodiment where machining is required on the article, the green compact is annealed prior to sintering, by heating in a non-oxidising and carbon neutral environment to 700° C. and 850° C. and then holding for 15 min to 60 min and then cooling slowly to room temperature at the rate not exceeding 30° C.//hr after which machining is carried out to effect the required shape changes in the article. The machined article is then sintered by heating in a protective non-oxidising & non-carburising and non-decarburising gaseous atmosphere, to temperatures ranging from 1050° C. to 1350° C. for periods ranging from 15-120 min in a batch type furnace or a continuous furnace. Alternatively, the atmosphere is vacuum maintained at a level of 0.05 torr or lower.

In one embodiment, the present disclosure provides for a manual transmission gearbox comprising the shifter dog 50.

Table of Referral Numerals

TABLE 2

| Referral Numeral | Description |
|---|---|
| 1 | Stick or gear lever |
| 2 | Spherical end of gear lever or Gear lever knob |
| 3 | Slot in the shifter dog 50 according to prior art |
| 4 | Shaft of the transmission gear according to prior art |
| 6 | Cylindrical portion of the shifter dog 50 according to the prior art |
| 7a | Slot in the shifter dog 50 according to the present disclosure |
| 7 | Location of the shifter dog 50 comprising functionally graded composition |
| 8 | Cylindrical portion of the shifter dog 50 comprising functionally graded composition according to the present disclosure |
| 9, 11 | Hoppers |
| 10, 12 | Hoses |
| 13 | Feedshoe |
| 14 | Partition |
| 15 | Die assembly consisting of die case and die insert |
| 16 | Core rod |
| 17 | Bottom punch 1 |
| 18 | Bottom Punch 2 |
| 19 | Bottom Punch 3 |
| 20a, 21a | Top punches |
| 20b, 21b | Bottom punches |
| 22 | A geometrical embodiment of shifter dog 50 |
| 23 | Another geometrical embodiment of shifter dog 50 |
| 24 | Yet another geometrical embodiment of shifter dog 50 |

In one embodiment of the present disclosure, an article having plurality of compositions/materials in functionally graded regions within the article is provided. The composition/material comprises two different grades of powder metal steel, optionally along with industrially applicable additive as in lubricants for aiding compaction and machining aids. The article comprises at least two compositions in the at least two functionally graded regions. The two compositions are chemically different from one another. In an exemplary embodiment, the article comprises two compositions in two functionally graded regions, such that one of the functionally graded region is having lower wear resistance, mechanical strength and with a predominantly pearlitic microstructure and the other possessing higher wear resistance (hardness), mechanical strength and with a predominantly martensitic microstructure.

In one embodiment of the present disclosure, the chemical compositions of the region corresponding to location 7 as shown in the FIG. 3, can be as specified in the following MPIF designation of PM steels viz. MPIF FL Series—Prealloyed Steels or MPIF FLN, FLNC Series—Hybrid Low Alloy Steels OR MPIF FL, FLC, FLNC Series—Sinter-Hardened Steels and its equivalent in ISO, DIN, BS, AFNOR, JASO etc. standards.

In one embodiment of the present disclosure, the chemical compositions of the region corresponding to location 8 as shown in the FIG. 3, can be as specified in the following MPIF designation of PM steels viz. MPIF F series—Iron and Carbon Steels OR MPIF FC Series—Iron-Copper and Copper Steels OR MPIF FN Series—Iron Nickel and Nickel Steels OR MPIF FD, FLD, FLDNC Series—Diffusion alloyed steels and its equivalent in ISO, DIN, BS, AFNOR, JASO etc. standards.

In one embodiment, the article is a shifter dog 50 used for manual transmission gear box in automobiles comprising at least two functionally graded regions.

In an exemplary embodiment of the present disclosure, a method of manufacturing the article is provided. The method comprising acts of filling cavity configured on the article with composition comprising two or more powder mixes each containing unalloyed or pre-alloyed iron mixed with additives which includes amongst others C, Ni, Mo, Mn, Cr, V, W, Cu, in varying amounts, and industrially applicable additives like binders and lubricants for aiding compaction and aids for subsequent machining and simultaneously pressing the filled composition in the article in a single stroke using predetermined pressing device to obtain a green compact of the article. The die cavity on which the article is configured has two functionally graded regions such that the at least one of the functionally graded region is having lower hardness, non-martensitic microstructure and lower mechanical strength, than that of the other functionally graded region which has higher hardness, substantial martensitic microstructure and higher mechanical strength. After pressing the article, the green compact is annealed in vacuum or endo-gas or $N_2+H_2$ atmosphere between predetermined temperatures for predetermined hours. The annealing is carried-out in temperatures ranging between 700° C. to 900° C. for 0.25-6 hours in either a batch type or continuous furnace. Upon annealing the green compact, the annealed compact is cooled to room temperature ranging between 265 K and 325 K and machining the compact to the required shape. After machining the annealed compact, sintering is carried-out in a furnace by heating at temperatures ranging between 1050° C. and 1300° C. for 0.5-6 hours in a protective atmosphere.

In one embodiment, the present disclosure provides for a manual transmission gear box comprising the shifter dog 50 as shown in FIG. 3.

Figure 5:
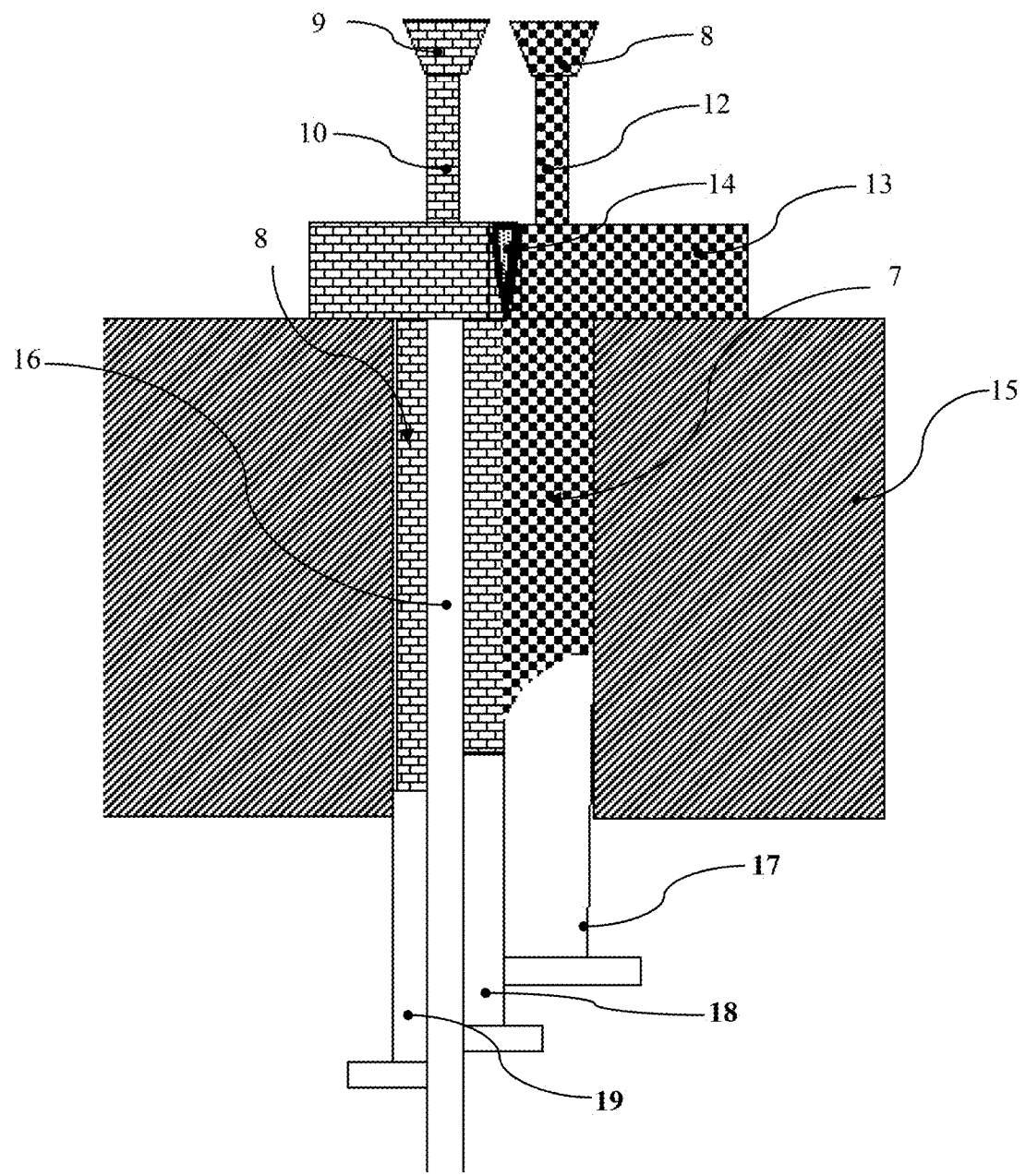
FIG. 5 shows the schematic of the tool layout at the beginning compaction of a functionally graded shifter dog according to one non-limiting embodiment of the present disclosure.

FIG. 5 illustrates a sectional elevation view of device used to manufacture functionally graded regions in shifter dogs 50 in accordance with the present disclosure. As shown, the functionally graded regions 7 and 8 of FIG. 3 refer to the portion of the shifter dog 50 which are substantially martensitic (hard, higher strength) and non-martensitic (substantially pearlitic) (soft, low strength) respectively. The functionally graded region 7 forms a fork portion 7*b* of the shifter dog 50 and the functionally graded region 8 forms a sleeve portion 8*b* of the shifter dog 50. The powder mixes for the respective graded regions flow into the die cavity from hoppers 9 and 11 through hoses 10 and 12 respectively and via the feedshoe 13. The flow of powders from hopper to die cavity through the respective hoses and through the feedshoe 13 is simultaneous and not sequential. The feedshoe 13 is provided with a partition 14 which enable the powders to form chemically distinct zones of the product in the die cavity. Once the different powder mixes fill up the die cavity, the powder mixes are compressed with aid of top punches 20*a*, 21*a* and bottom punches 20*b*, 21*b* and core rod 21*c* to yield a physically homogenous precursor to the sintered product, henceforth referred to as the green compact. The green compact is annealed by heating to temperatures between 700° C. to 900° C. and soaking at that temperature for 0.15-6 hours in vacuum of 0.01 to 0.0001 torr or N2+H2 or endo gas after which they are cooled to room temperature of about 265K to about 325K. On cooling, the annealed compact is machined and then is sintered in a furnace by heating the green compact or the coined compact between 1100° C. to 1300° C. and for a period of 30 to 360 minutes resulting in a functionally graded shifter dog 50 as in FIG. 3.

In one embodiment, the present disclosure provides functionally graded shifter dog 50 having required martensitic microstructure, high hardness and mechanical strength directly after sintering without having to resort to a separate hardening operation. This is achieved by cooling with the aid of the gaseous protective atmosphere in the sintering furnace at cooling rates ranging from 0.5° C./sec and 10° C./sec FIG. 6 illustrates schematic of the tool layout at the end compaction resulting in the formation of a functionally graded shifter dog 50 according to one non-limiting embodiment of the present disclosure. The top punches 20*a* and 21*a* move downwards and the bottom punches 20*b* and 21*b* move upwards compressing the powder in the die cavity to reach the position shown in the figure where the thickness and density of the part is attained. Alternatively, the bottom punch upward movement can be achieved by the die moving downwards along with the top punches.

FIG. 7 illustrates the sectional elevation of the functionally graded shifter dog 50 at the end of compaction according to one non-limiting embodiment of the present disclosure.

FIG. 8 illustrates a sectional elevation of the functionally graded shifter dog 50 after machining according to one non-limiting embodiment of the present disclosure.

FIG. 9 illustrate a sectional elevation of the of the functionally graded shifter dog 50 after machining according to one non-limiting embodiment of the present disclosure.

ADVANTAGES

In one embodiment, the shifter dog 50 is optimally designed and manufactured to suit the functional requirements. In particular, having distinct functionally graded regions with different materials/compositions within the shifter dog 50 as described above, results in the achievement of the required microstructure, hardness and mechanical strength with greater manufacturing ease.

Table 3 below provides a comparison of the process known in the art and the processes of instant disclosure in manufacturing the shifter dog 50 along with the advantages/benefits derived thereof.

TABLE 3

| Operation Number | Prior art Process | Improved Process 1 | Improved Process 2 |
| --- | --- | --- | --- |
| 1 | Blending | Blending | Blending |
| 2 | Compaction | Functionally Graded Compaction | Functionally Graded Compaction |
| 3 | Sintering | Sinter-Hardening | Sintering |
| 4 | Machining | Machining | Machining |
| 5 | Heat Treatment | Heat Treatment | Heat Treatment |
| Benefit | | Lower number of manufacturing steps Lower raw material costs by using low alloy raw material in low performance zone (MPIF FC0208) and higher alloy raw material in high performance zone (MPIF FLC 4808) | Lower raw material costs by using low alloy raw material in low performance zone (MPIF FC0208) and higher alloy raw material in high performance zone (MPIF FD0208) |

In one embodiment, the present disclosure providing a functionally graded shifter dog 50 has different chemical composition in different locations of the shifter dog 50 enabling to optimally suit the particular function of the localized regions within the shifter dog 50.

EQUIVALENTS

With respect to the use of substantially any plural and/or singular terms herein, those having skill in the art can translate from plural to singular and/or from singular to plural as is appropriate to the context and/or application. The various singular/plural permutations may be expressly set forth herein for sake of clarity. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A shifter dog for a manual transmission gearbox having a plurality of functionally graded regions comprising:
    a sleeve portion of a substantially cylindrical shape; and
    a fork portion integrally formed on an outer circumference of the sleeve portion;
    wherein, the fork portion is formed of at least one first functionally graded material having a martensitic microstructure selected from the group consisting of FL5305, FLC4608, FLC-4805, FLC-48108, FLC2-4808, FLC2-5208, FLC24908, FLNC4408, FLNC4405, FLN4-4405, FLN4-4408, FLN4-4405 (HTS) and combinations thereof; and
    wherein, the sleeve portion is formed of at least one second functionally graded material having a non-martensitic microstructure selected from the group consisting of MPIF F-0000, F-0005, F-0008, MPIF FC 0200, FC0205, FC 0208, FC0505, FD0200, FC 0808, FC1000, MPIF FN0200, FN0205, FN0208, FN0405, FN0408, FN5000, FX1000, FX1005, FX-1008, MPIF FD0200, FD 0205, FD0208, FD0400, FD0405, FD0408, FLN2-4400 and combinations thereof.

2. The shifter dog as claimed in claim 1, wherein the non-martensitic microstructure is selected from a group comprising pearlitic, bainitic, ferritic microstructure and combinations thereof.

3. The shifter dog as claimed in claim 1, wherein the at least one second functionally graded region having the non-martensitic microstructure comprises at least 70% pearlitic microstructure.

4. The shifter dog as claimed in claim 1, wherein the at least one first functionally graded material having the martensitic microstructure is made of a composition selected from a group comprising powder metal of pre-alloyed Steels, hybrid low alloy steels, Sinter-Hardened Steels.

5. The shifter dog as claimed in claim 1, wherein the at least one second functionally graded material having the non-martensitic microstructure is made of a composition selected from a group comprising powder metal of Iron and Carbon Steels, Iron-Copper and Copper Steels, Iron-Nickel and Nickel Steels, Diffusion alloyed steels.

6. A transmission gearbox comprising a shifter dog as claimed in claim 1.

7. The shifter dog as claimed in claim 1, wherein the at least one first functionally graded material is a high strength alloy.

8. The shifter dog as claimed in claim 1, wherein the at least one second functionally graded material is a low strength alloy.

* * * * *